Patented July 25, 1939

2,167,203

UNITED STATES PATENT OFFICE 2,167,203

PROCESS OF MANUFACTURE OF KETONES AND ALCOHOLS FROM OLEFINS

Henri Martin Emmanuel Guinot, Niort, France, assignor to Usines de Melle, Melle, Deux-Sevres, France, a corporation of France No Drawing. Application March 24, 1937, Serial No. 132,871. In France March 28, 1936

7 Claims. (Cl. 260—597)

This invention relates to the manufacture of ketones and alcohols from olefins.

It is already known to produce alcohols from olefins by hydration in the presence of catalysts or certain chemical reagents.

When working by simple catalysis, high temperatures and pressures must be employed; nevertheless, the velocity of reaction is small per unit of volume of the catalytic chamber. Also, the processes based on this method of working have not yet undergone any great industrial development.

As regards the processes based on the employment of powerful chemical reagents such as sulphuric acid, it is necessary to overcome the difficulty of the unlimited recovery of the reagent employed, without which recovery no profitable working is possible.

In any case, any of these processes can produce only the secondary or tertiary alcohols derived from the olefins treated.

The process forming the subject matter of the present invention produces from olefins not only secondary alcohols but also ketones and primary alcohols. Now, the ketones are sometimes much more interesting than the alcohols themselves from the industrial point of view; this is the case, for example, with ordinary acetone, the consumption of which is much greater than that of the corresponding alcohol—namely, isopropyl alcohol. Also, for certain uses, for example for obtaining solvents employed in the manufacture of lacquers and varnishes, the primary alcohols are much more in demand than are the secondary or tertiary alcohols. Consequently, the commercial interest of the present invention is obvious.

The invention consists in first of all causing the olefins to be converted into chlorhydrins as by being absorbed in a solution of hypochlorous acid. The chlorhydrins are preferably dehydrated and converted into alkylene oxides which are hydrogenated in the presence of catalysts in order to obtain a mixture of ketones and alcohols. A certain proportion of primary alcohols is found among the latter.

In one practical method of carrying out the invention, the preliminary conversion of the olefins into chlorhydrins is effected by the known employment of chlorine water.

The reaction is expressed thus:

$C_nH_{2n}+HOH+Cl_2=ClC_nH_{2n}—OH+HCl$

The hydrochloric acid is then neutralized by means of an equivalent quantity of caustic soda; the chlorhydrin is then separated by known means. This chlorhydrin, on being treated with a further molecule of soda, gives the corresponding alkylene oxide

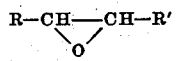

R—CH——CH—R'
   \\O/

After thus having employed one molecule of chlorine and two molecules of caustic soda as initial materials, two molecules of sodium chloride are then disposed of. The sodium chloride thus recovered is electrolyzed and gives the quantities of chlorine and soda which are necessary for the conversion of a fresh molecule of olefin into alkylene oxide, and so on. Finally, it is therefore sufficient to consume current by way of electrolysis in order to obtain the desired oxide, since the sodium chloride is recovered indefinitely. Moreover, this electrolysis gives, at the same time as soda and chlorine, the quantity of hydrogen that is required for the complete hydrogenation, up to the alcohol group, of the alkylene oxide obtained.

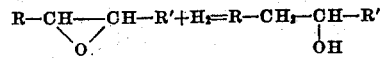

R—CH——CH—R'+H$_2$=R—CH$_2$—CH—R'
   \\O/                          |
                                 OH or isomers Briefly, in order to convert the olefins treated according to the invention, it is only necessary to supply a certain stock of common salt as an initial material and then to consume some current for electrolysis. Chlorine and soda are produced transitorily, but, as hereinbefore indicated, these two products soon recombine to form common salt again. As for the hydrogen, this is supplied, in addition, at the expense of the water in the course of the electrolysis of the common salt.

The hydrogenation proper of the alkylene oxides is effected preferably in the vapour phase with the employment of reduced metals such as nickel, copper and cobalt either alone or mixed and either associated or not with carriers or activators.

This hydrogenation has the curious feature of giving a very considerable proportion of normal alcohol whereas the secondary alcohol would rather have been expected.

We have the double reaction:

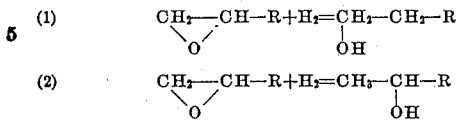

Reaction 1 is sometimes predominant.

It is also interesting to point out that the primary alcohols are obtained in a small quantity even when alkylene oxides of the form

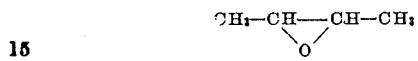

are hydrogenated; this is quite unexpected.

The following examples, which are not limitative, will enable the invention to be well understood.

A mixture of butene-1 and butene-2 is treated with chlorine water in an apparatus such as, for example, that described in the specification of British patent application No. 6274/36. The efficacy of this apparatus is such that the absorption of the butenes is rapid even if they are diluted with inert gases as is the case when butenes from cracking which are mixed with a large proportion of butanes are employed.

The butylene chlorhydrins corresponding to the butylenes 1 and 2 treated are finally obtained. When their concentration in the aqueous liquid exceeds ⅓ mol per litre, these chlorhydrins decant spontaneously. Nothing is then simpler than to separate them by using a solvent such as benzene in a counter-current extraction battery after neutralising the acid liquid with a solution of caustic soda. On evaporating the layer of solvent which also serves for carrying away the water, there is obtained a mixture of anhydrous chlorhydrins boiling at a temperature of 132 to 146° C. As for the salt solution, freed from chlorhydrin, leaving the battery, this is concentrated in order to obtain from it a solution which is capable of again undergoing electrolysis.

The chlorhydrins thus separated are heated and a solution of caustic soda is then added to them little by little. The oxides distil whilst the chlorhydrins, the boiling point of which is higher, are continually brought back, by means of some vapour-refining device, into the vessel where the reaction is carried out.

Finally, butylene oxides are obtained with a yield of 95% and boiling at a temperature of about 54 to 63° C. On the other hand, there remains in the reaction vessel a saline paste which is rich in crystals of common salt and which is again sent to the electrolysis room. The hydrogen formed in the course of the electrolysis is then employed for hydrogenating the butylene oxides with the production of methylethyl ketone and of butyl alcohols. This operation constitutes one of the most important industrial results of the invention.

The hydrogenation can be carried out in the gaseous phase with nickel as catalyst; the hydrogenation takes place from 70° C. It is rapid at 90° C. At this temperature, methylethyl ketone, secondary butyl alcohol and normal butyl alcohol are obtained even if the butylene oxide treated corresponds to the symmetrical form

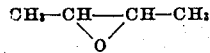

considered as boiling at 56 to 57° C.; this is quite unexpected. Only a small quantity of heavy products consisting of polymers of the oxides treated is formed.

Here is an example of the comparative results obtained for a hydrogenation carried out over nickel at the temperature of 90° C. either with the symmetrical butylene oxide boiling at 55 to 57° C. of with the asymmetric butylene oxide boiling at 59 to 61° C.

| | Unconverted oxide | Methylethyl ketone | Secondary butyl alcohol | Normal butyl alcohol | Heavy products |
|---|---|---|---|---|---|
| | Percent | Percent | Percent | Percent | Percent |
| Butylene oxide B. P. 55-57° C. | 8.5 | 21 | 62.5 | 6.5 | 1.5 |
| Butylene oxide B. P. 59-61° C. | 8.0 | 20 | 47 | 23.2 | 1.8 |

It is seen that, with the symmetrical oxide, the normal butyl alcohol formed is a tenth of the secondary butyl alcohol. With the asymmetric oxide, only twice as much of the secondary alcohol is formed as of the normal alcohol.

Here is a second example:—

Propylene coming, for example, from cracking gases and, consequently, mixed with inert gases propanes or others is treated so as to be converted into chlorhydrins. The latter are extracted by means of a solvent, such as ethylene chloride, from the aqueous solution obtained.

There is thus obtained a liquid which boils at a temperature of 125 to 135° C. and which is converted into propylene oxide by soda. Its boiling point is 35° C. at the pressure of 760 mms.

The propylene oxide, on being subjected to hydrogenation in the vapour phase over nickel heated to 70° C., gives a mixture which is rich in normal propyl alcohol and contains, in addition, a small quantity of acetone and isopropyl alcohol.

By increasing, for a given furnace, the rate of supply of the propylene oxide, the proportion of acetone that is formed is increased.

Here again, the proportion of heavy products formed is insignificant.

What I claim is:

1. A continuous process of manufacturing a mixture of ketones and alcohols from olefins comprising essentially treating an olefin with hypochlorous acid to produce the corresponding chlorhydrin, neutralizing the hydrochloric acid thus formed with a first mass of caustic alkali, separating said chlorhydrin from the resulting alkali chloride, treating said chlorhydrin with a second mass of caustic alkali, separating the resultant alkylene oxide from the alkali chloride thus formed, catalytically hydrogenating said alkylene oxide to give a mixture of ketones and alcohols, subjecting the alkali chloride formed from said first and second masses of caustic alkali to electrolysis to give chlorine hydrogen and caustic alkali, reusing said chlorine in said process as hypochlorous acid to treat further amounts of said olefins, reusing said hydrogen to convert further amounts of said alkylene oxides into ketones and alcohols and reusing said caustic alkali for neutralizing further quantities of said hydrochloric acid and for treating further quantities of said chlorhydrin.

2. A continuous process of manufacturing a mixture of ketones and alcohols from olefins comprising essentially treating an olefin with hypochlorous acid to produce the corresponding chlorhydrin, neutralizing the hydrochloric acid thus formed with a first mass of caustic alkali, separating said chlorhydrin from the resulting alkali chloride, treating said chlorhydrin with a second mass of caustic alkali, distilling off the resultant alkylene oxide from the alkali chloride thus formed, catalytically hydrogenating said alkylene oxide in the vapour phase by the action of a heated hydrogenating catalyst to give a mixture of ketones and alcohols, subjecting the alkali chloride formed from said first and second masses of caustic alkali to electrolysis to give chlorine hydrogen and caustic alkali, reusing said chlorine in said process as hypochlorous acid to treat further amounts of said olefins, reusing said hydrogen to convert further amounts of said alkylene oxides into ketones and alcohols and reusing said caustic alkali for neutralizing further quantities of said hydrochloric acid and for treating further quantities of said chlorhydrin.

3. A continuous process of manufacturing a mixture of ketones and alcohols from olefins comprising essentially treating an olefin with hypochlorous acid to produce the corresponding chlorhydrin, neutralizing the hydrochloric acid thus formed with a first mass of caustic alkali, separating said chlorhydrin from the resulting alkali chloride, treating said chlorhydrin with a second mass of caustic alkali, separating the resultant alkylene oxide from the alkali chloride thus formed, catalytically hydrogenating said alkylene oxide in the vapour phase with a reduced metal catalyst to about 70° C. to give a mixture of ketones and alcohols, subjecting the alkali chloride formed from said first and second masses of caustic alkali to electrolysis to give chlorine hydrogen and caustic alkali, reusing said chlorine in said process as hypochlorous acid to treat further amounts of said olefins, reusing said hydrogen to convert further amounts of said alkylene oxides into ketones and alcohols and reusing said caustic alkali for neutralizing further quantities of said hydrochloric acid and for treating further quantities of said chlorhydrin.

4. A continuous process of manufacturing a mixture of ketones and alcohols from olefins comprising essentially treating an olefin with hypochlorous acid to produce the corresponding chlorhydrin, neutralizing the hydrochloric acid thus formed with a first mass of caustic alkali, separating said chlorhydrin from the resulting alkali chloride, treating said chlorhydrin with a second mass of caustic alkali, distilling off the resultant alkylene oxide from the alkali chloride thus formed, catalytically hydrogenating said alkylene oxide in the vapor phase at atmospheric pressure with the use of a heated metallic hydrogenating catalyst to give a mixture of ketones and alcohols, subjecting the alkali chloride formed from said first and second masses of caustic alkali to electrolysis to give chlorine hydrogen and caustic alkali, reusing said chlorine in said process as hypochlorous acid to treat further amounts of said olefins, reusing said hydrogen to convert further amounts of said alkylene oxides into ketones and alcohols and reusing said caustic alkali for neutralizing further quantities of said hydrochloric acid and for treating further quantities of said chlorhydrin.

5. A continuous process of manufacturing a mixture of ketones and alcohols from olefins comprising essentially treating an olefin with hypochlorous acid to produce the corresponding chlorhydrin, neutralizing the hydrochloric acid thus formed with a first mass of caustic alkali, separating said chlorhydrin from the resulting alkali chloride, treating said chlorhydrin with a second mass of caustic alkali, distilling off the resultant alkylene oxide from the alkali chloride thus formed, catalytically hydrogenating said alkylene oxide in the vapor phase at atmospheric pressure with the use of a reduced metal catalyst heated to about 70° C. to give a mixture of ketones and alcohols, subjecting the alkali chloride formed from said first and second masses of caustic alkali to electrolysis to give chlorine hydrogen and caustic alkali, reusing said chlorine in said process as hypochlorous acid to treat further amounts of said olefins, reusing said hydrogen to convert further amounts of said alkylene oxides into ketones and alcohols and reusing said caustic alkali for neutralizing further quantities of said hydrochloric acid and for treating further quantities of said chlorhydrin.

6. A continuous process of manufacturing a mixture of methylethyl ketone and butyl alcohols from butenes, comprising essentially treating a mixture of butene-1 and butene-2 with hypochlorous acid to produce the corresponding butene chlorhydrins, neutralizing the hydrochloric acid formed with a first mass of caustic alkali, separating said butene chlorhydrins from the alkali chloride thus formed, treating said butene chlorhydrin with a second mass of caustic alkali, separating the resultant butylene oxides from the alkali chloride formed, catalytically hydrogenating said butylene oxides in the vapor phase with a nickel catalyst at about 70° C. to give a mixture of methylethyl ketone and butyl alcohols and subjecting the alkali chloride formed from said first and second masses of caustic alkali to electrolysis to give chlorine, hydrogen and caustic alkali, said chlorine being used for producing further hypochlorous acid, said hydrogen being used to convert further quantities of said butylene oxides into methylethyl ketone and butyl alcohols and said caustic alkali being used for neutralizing further hydrochloric acid and for treating further butylene chlorhydrins.

7. A continuous process of manufacturing a mixture of acetone, isopropyl and n-propyl alcohol from propylene comprising essentially treating the propylene with hypochlorous acid to produce propylene chlorhydrin, neutralizing the hydrochloric acid formed with a first mass of caustic alkali, separating the propylene chlorhydrin from the alkali chloride formed, treating said propylene chlorhydrin with a second mass of caustic alkali, separating the resultant propylene oxide from the alkali chloride formed, catalytically hydrogenating said propylene oxide in the vapor phase with a nickel catalyst at about 70° C. to give a mixture of acetone, isopropyl alcohol and n-propyl alcohol, and subjecting the alkali chloride formed from said first and second masses of caustic alkali to electrolysis to give chlorine, hydrogen and caustic alkali, said chlorine being used for producing further hypochlorous acid, said hydrogen being used to convert further quantities of said propylene oxide into acetone, isopropylene and n-propyl alcohol and said caustic alkali being used for neutralizing further hydrochloric acid and for treating further propylene chlorhydrin.

HENRI MARTIN EMMANUEL GUINOT.

CERTIFICATE OF CORRECTION.

Patent No. 2,167,203.   July 25, 1939.

HENRI MARTIN EMMANUEL GUINOT.

It is hereby certified that the name of the assignee in the above numbered patent was erroneously described and specified as "Usines de Melle" whereas said name should have been described and specified as Les Usines de Melle, of Melle, Deux-Sevres, France, a corporation of France, as shown by the record of assignments in this office; and that the said Letters Patent should be read with this correction therein that the same may conform to the record of the case in the Patent Office.

Signed and sealed this 3rd day of October, A. D. 1939

(Seal)

Henry Van Arsdale,
Acting Commissioner of Patents.